United States Patent
Tokunaga et al.

(10) Patent No.: US 8,654,070 B2
(45) Date of Patent: Feb. 18, 2014

(54) ELECTROPHORETIC PARTICLES, ELECTROPHORETIC PARTICLE DISPERSION, DISPLAY MEDIUM AND DISPLAY DEVICE

(75) Inventors: Nami Tokunaga, Minamiashigara (JP); Jun Kawahara, Minamiashigara (JP); Daisuke Nakayama, Minamiashigara (JP); Yasuo Yamamoto, Minamiashigara (JP); Hiroaki Moriyama, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 715 days.

(21) Appl. No.: 12/723,876

(22) Filed: Mar. 15, 2010

(65) Prior Publication Data

US 2011/0043441 A1 Feb. 24, 2011

(30) Foreign Application Priority Data

Aug. 21, 2009 (JP) ................................ 2009-192406

(51) Int. Cl.
*G09G 3/34* (2006.01)
*C09K 3/00* (2006.01)
*G03G 17/04* (2006.01)

(52) U.S. Cl.
USPC ........... 345/107; 204/600; 252/500; 252/573; 252/574; 252/579; 359/296; 430/32; 430/33

(58) Field of Classification Search
USPC ................. 204/600; 252/500, 573, 574, 579; 345/107; 359/296; 428/447; 430/32, 430/33; 524/588
See application file for complete search history.

(56) References Cited

U.S. PATENT DOCUMENTS

| | | | |
|---|---|---|---|
| 7,952,791 B2 * | 5/2011 | Yanagisawa et al. | ......... 359/296 |
| 2002/0146572 A1 | 10/2002 | Yanagisawa | |
| 2005/0136347 A1 | 6/2005 | Gu et al. | |

(Continued)

FOREIGN PATENT DOCUMENTS

JP 2004-204103 A 7/2004

(Continued)

OTHER PUBLICATIONS

Japanese Office Action dated Apr. 16, 2013, issued in Japanese Patent Application No. 2009-192406.

*Primary Examiner* — Bijan Ahvazi
(74) *Attorney, Agent, or Firm* — Sughrue Mion, PLLC

(57) ABSTRACT

Electrophoretic particles including mother particles and a dispersant that covers the surface of the mother particles, the mother particles including a resin and a colorant, and the dispersant having a structure represented by the following Formula (1):

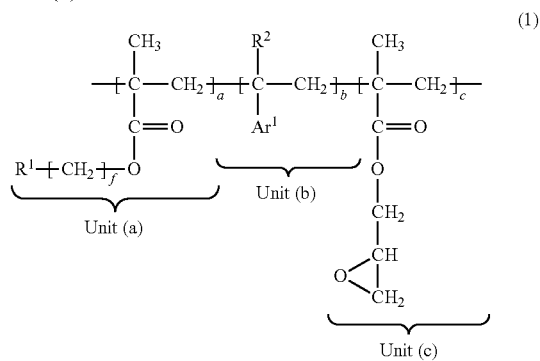

wherein in Formula (1), $R^1$ represents a dimethyl siloxane chain that comprises two or more dimethyl siloxane structures that are linked together, the dimethyl siloxane chain being optionally substituted by an organic group; $R^2$ represents a hydrogen atom or a methyl group; $Ar^1$ represents an organic group having an aromatic group; a represents an integer of from 8 to 88; b represents an integer of from 12 to 82; c represents an integer of from 0 to 30; f represents an integer of from 1 to 3; the total of a, b and c is 100; and the ratio of unit (b) in the dispersant having a structure represented by Formula (1) is about 50% by weight or less.

8 Claims, 5 Drawing Sheets

(56) References Cited

U.S. PATENT DOCUMENTS

2009/0207476 A1 8/2009 Yanagisawa et al.

FOREIGN PATENT DOCUMENTS

| | | | |
|---|---|---|---|
| JP | 3936588 | B2 | 3/2007 |
| JP | 2007-508588 | A | 4/2007 |
| JP | 2007-534006 | A | 11/2007 |
| JP | 2008-076492 | A | 4/2008 |
| JP | 2008-287102 | A | 11/2008 |
| WO | 2005/036129 | A2 | 4/2005 |

\* cited by examiner

[t0]

[t1]

[t2]

[t3]

ELECTROPHORETIC PARTICLES, ELECTROPHORETIC PARTICLE DISPERSION, DISPLAY MEDIUM AND DISPLAY DEVICE

CROSS-REFERENCE TO RELATED APPLICATION

This application is based on and claims priority under 35 USC 119 from Japanese Patent Application No. 2009-192406 filed Aug. 21, 2009.

BACKGROUND

1. Technical Field

The invention relates to electrophoretic particles, an electrophoretic particle dispersion, a display medium, and a display device.

2. Related Art

A display device employing a three-valued electrophoretic system, which displays an image in a manner whereby each pixel displays multiple colors (a single-pixel multi-color display system), is expected to bring into realization electronic paper media that can display a high-quality color image. In order to realize the single-pixel multi-color display system, it is necessary that the value of threshold voltages to be applied to electrophoretic particles of the display device is controlled, and that the values of threshold voltages of the electrophoretic particles of different colors are different.

SUMMARY

According to an aspect of the invention, there is provided an electrophoretic particles including mother particles and a dispersant that covers the surface of the mother particles, the mother particles including a resin and a colorant, and the dispersant having a structure represented by the following Formula (1):

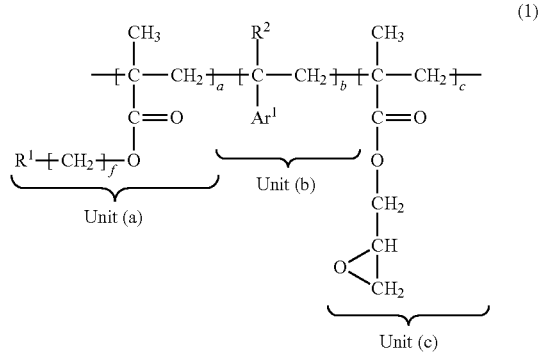

wherein in Formula (1), $R^1$ represents a dimethyl siloxane chain that comprises two or more dimethyl siloxane structures that are linked together, the dimethyl siloxane chain being optionally substituted by an organic group; $R^2$ represents a hydrogen atom or a methyl group; $Ar^1$ represents an organic group having an aromatic group; a represents an integer of from 8 to 88; b represents an integer of from 12 to 82; c represents an integer of from 0 to 30; f represents an integer of from 1 to 3; the total of a, b and c is 100; and the ratio of unit (b) in the dispersant having a structure represented by Formula (1) is about 50% by weight or less.

BRIEF DESCRIPTION OF THE DRAWINGS

Exemplary embodiments of the present invention will be described in detail based on the following figures, wherein.

DETAILED DESCRIPTION

In the following, details of the present invention are described.

Electrophoretic Particles and Electrophoretic Particle Dispersion

First exemplary embodiment

Including a Single Kind (Single Color) of Electrophoretic Particles

The electrophoretic particles according to this exemplary embodiment includes mother particles that include a resin and a colorant, and a dispersant that covers the surface of the mother particles and has a structure represented by the following Formula (1).

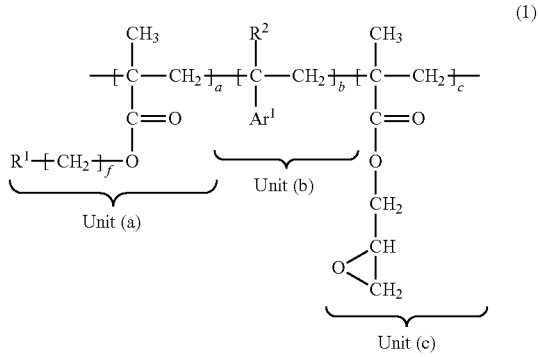

In Formula (1), $R^1$ represents a dimethyl siloxane chain that includes two or more dimethyl siloxane structures linked with each other, the dimethyl siloxane structures being optionally substituted by an organic group; $R^2$ represents a hydrogen atom or a methyl group; $Ar^1$ represents an organic group having an aromatic group; a represents an integer of from 8 to 88; b represents an integer of from 12 to 82; c represents an integer of from 0 to 30; f represents an integer of from 1 to 3; the total of a, b and c is 100; and the ratio of unit (b) in the dispersant having a structure represented by Formula (1) is 50% by weight or less or about 50% by weight or less.

Further, the electrophoretic particle dispersion according to this exemplary embodiment includes the aforementioned electrophoretic particles, and a dispersing medium in which the electrophoretic particles are dispersed.

Figure 1A:
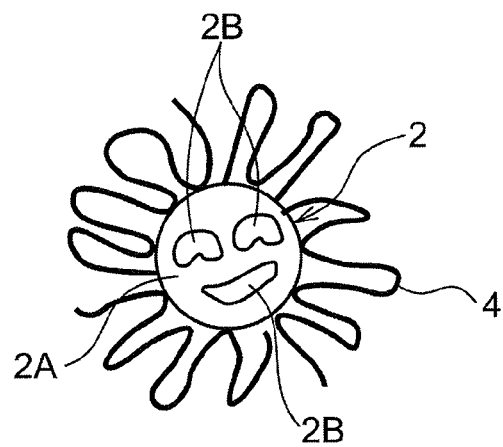
FIG. 1A is a schematic view of the structure of electrophoretic particle according to an exemplary embodiment of the invention.

FIG. 1A schematically shows an exemplary structure of the mother particle and the dispersant that form the electrophoretic particles according to this exemplary embodiment. In FIG. 1A, dispersant 4 having a structure represented by Formula (1) covers the surface of mother particle 2 that includes resin 2A and colorant 2B.

By having the structure as mentioned above, it is possible to control the ratio of unit (b), i.e., the value of b in Formula (1), thereby readily adjusting the threshold voltage of the electrophoretic particles.

Figure 1B:
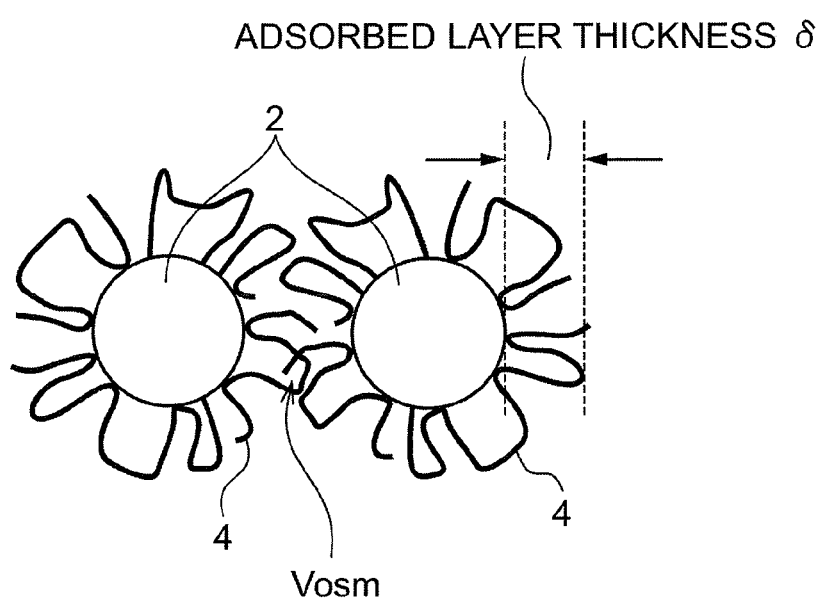
FIG. 1B is a schematic view of the electrophoretic particles according to an exemplary embodiment of the invention that are forming a flocculation.

The reason why the threshold voltage of the electrophoretic particles can be readily adjusted by controlling the ratio of unit (b) is not exactly clear, but it is presumed to be as follows. As shown in FIG. 1B, the two electrophoretic particles form a flocculation by means of dispersant 4 that covers respective particles. As a result, an osmotic pressure repulsive force is formed between the two electrophoretic particles. The osmotic pressure repulsive force ($V_{osm}$) is expressed by the following expression.

$$V_{osm} = \propto \text{second virial coefficient} \times (\text{adsorption density } (C))^2 \times (\text{thickness of adsorption layer (dispersant layer)}(\delta))^3$$

In dispersant 4 having a structure represented by Formula (1), it is presumed that unit (b) functions as an adsorption site, and that the value of "adsorption density (C)" in the above expression changes according to the numbers of the adsorption sites. Therefore, when the value of b in Formula (1) is decreased, the value of $V_{osm}$ is decreased and the electrophoretic particles are made more prone to form a flocculation, thereby increasing the value of threshold voltage. On the other hand, when the value of b in Formula (1) is increased, the value of $V_{osm}$ is increased and the electrophoretic particles are made less prone to form a flocculation, thereby decreasing the value of threshold voltage.

The propensity of the electrophoretic particles to form a flocculation may also be controlled by controlling the affinity of mother particles 2 and dispersant 4, adjusting the molecular weight of dispersant 4, or the like.

<Behavior of Electrophoretic Particles>

In the following, the behavior of the electrophoretic particles upon application of a voltage in a display medium using the electrophoretic particle dispersion according to this exemplary embodiment, which includes one kind of electrophoretic particles, is described with reference to FIGS. 2A to 2D. Further, the relationship between the voltage (rectangular wave) to be applied and the charge amount is shown in FIG. 3.

Figure 2A:
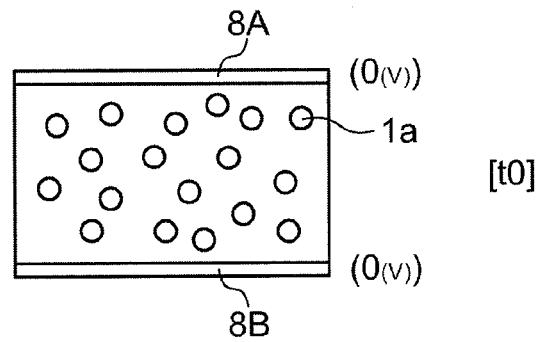
FIGS. 2A to 2D are schematic views of the display medium using an electrophoretic particle dispersion including one kind of the electrophoretic particles according to an exemplary embodiment of the invention, which illustrate the behavior of the electrophoretic particles.
Figure 2B:
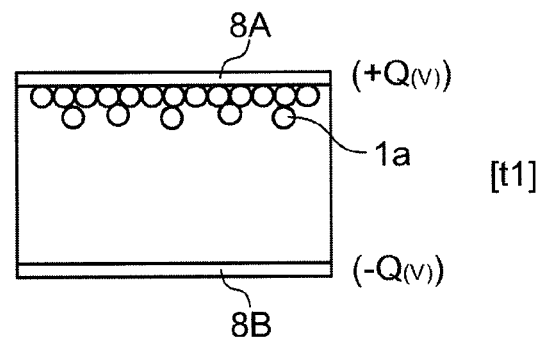
Figure 2C:
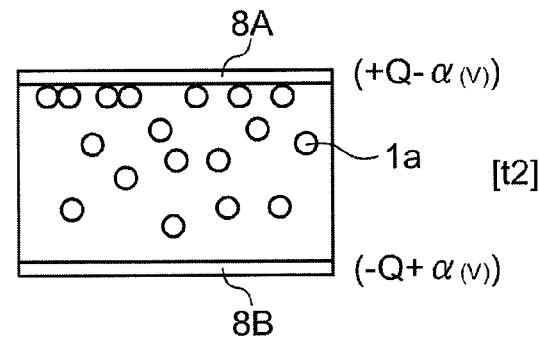
Figure 2D:
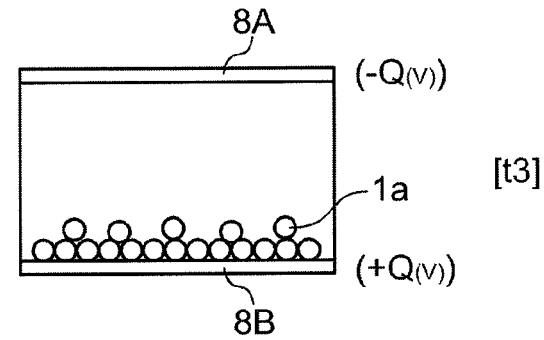
Figure 3:
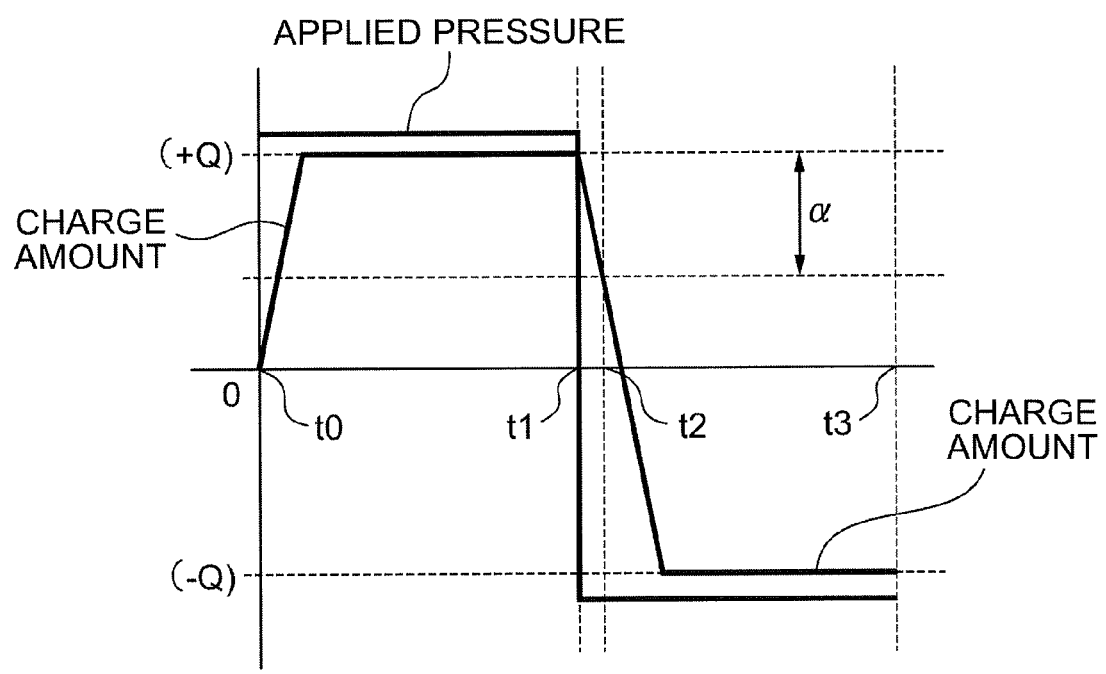
FIG. 3 is a graph of the relationship between the voltage to be applied (rectangular wave) and the charge amount which is shown in the states of FIGS. 2A to 2D, respectively.

FIG. 2A shows electrophoretic particles 1a that are dispersed in the dispersing medium, with no voltage applied to electrodes 8A and 8B (t0 in FIG. 3).

When a voltage of +Q (V) is applied to electrode 8A (Q: voltage that is not more than the threshold voltage of electrophoretic particles) and a voltage of −Q (V) is applied to electrode 8B, electrophoretic particles 1a move to the side of electrode 8A (t1 in FIG. 3).

Then, when a voltage of −Q (V) is applied to electrode 8A and a voltage of +Q (V) is applied to electrode 8B, electrophoretic particles 1a start to move from electrode 8A (t2 in FIG. 3), and are positioned at the side of electrode 8B (t3 in FIG. 3).

As shown above, the behavior of electrophoretic particles 1a can be adjusted by controlling the voltage applied to electrodes 8A and 8B. In this case, for example, when an image is displayed at the side of electrode 8A, the color of electrophoretic particles 1a can be visually recognized in the state of t1, while the color of electrophoretic particles 1a is not visually recognized in the state of t3 (if the color suspended particles as described later are dispersed in the dispersing medium).

Second Exemplary Embodiment

Including Two Kinds (Two Colors) of Electrophoretic Particles

The electrophoretic particle dispersion according to this exemplary embodiment may include two or more kinds of electrophoretic particles having different colors. In this case, it is preferable that the structures of unit (a) and unit (b) in Formula (1) of the dispersant of the two or more kinds of electrophoretic particles are the same, but the dispersants have different ratios of unit (b) in the dispersant.

<Behavior of Electrophoretic Particles>

In the following, the behavior of the electrophoretic particles in the electrophoretic particle dispersion according to this exemplary embodiment, including two or more kinds of electrophoretic particles having different colors, is described with reference to FIGS. 4A to 4D.

Display device 10 shown in FIGS. 4A to 4D includes display medium 12, voltage application unit 16 that applies a voltage to display medium 12, and control unit 18. Display medium 12 is formed from display substrate 20 that serves as an image display side, rear substrate 22 that faces display substrate 20 with a space, spacers 24 that divide the space between display substrate 20 and rear substrate 22 into plural cells, and electrophoretic particles 34 (positively charged) and electrophoretic particles 35 (negatively charged), which have different colors from each other and are contained in each cell.

The cell contains the electrophoretic particle dispersion according to this exemplary embodiment. Specifically, the cell contains dispersing medium 50 and electrophoretic particles 34 and 35 that are dispersed in dispersing medium 50. The structures of unit (a) and unit (b) in Formula (1) of the dispersant of electrophoretic particles 34 are the same as that of electrophoretic particles 35, but the ratio of unit (b) in the dispersant of electrophoretic particles 34 is different than that of electrophoretic particles 35. Further, the threshold voltage of electrophoretic particles 35 is adjusted to be greater than that of electrophoretic particles 34.

Figure 4A:
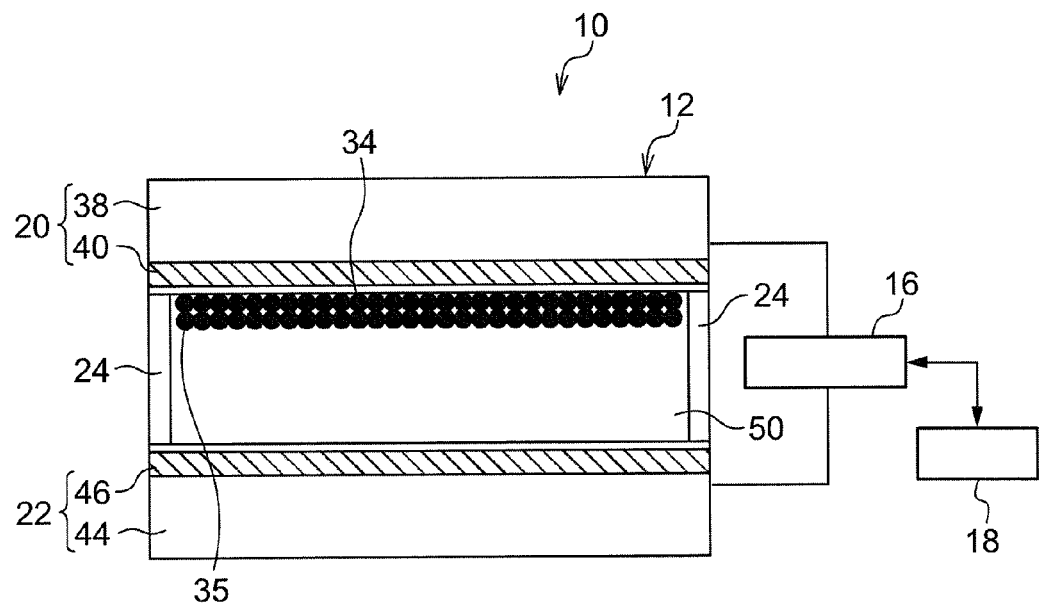
FIGS. 4A to 4D are schematic views of the display medium using an electrophoretic particle dispersion including two kinds of the electrophoretic particles according to an exemplary embodiment of the invention, which illustrate the behavior of the electrophoretic particles.
Figure 4B:
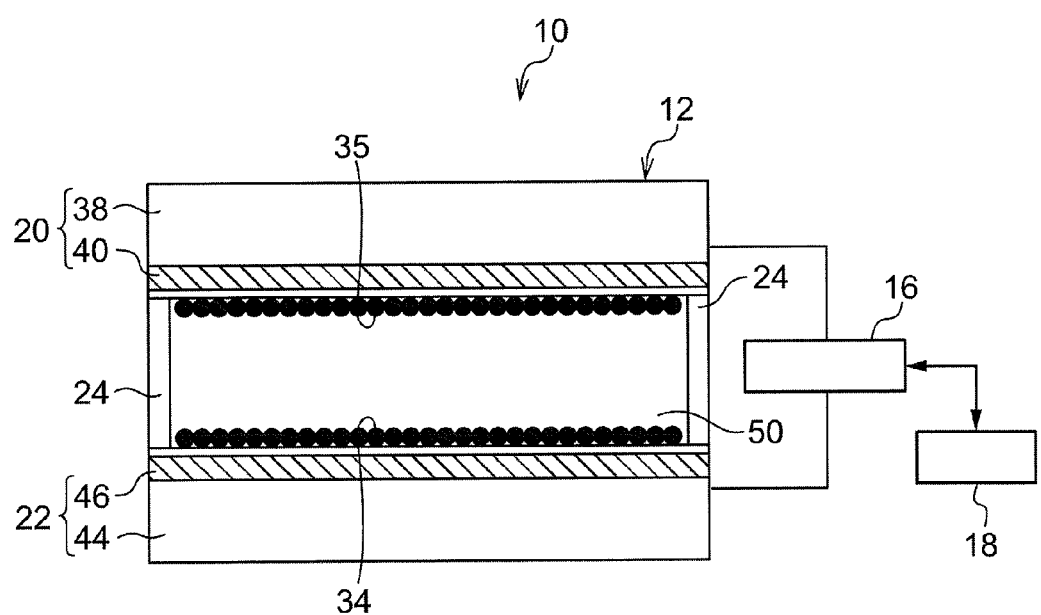

First, when a voltage (+) that is greater than the threshold voltage of electrophoretic particles 35 (greater threshold voltage) is applied to front electrode 40, and a voltage (−) that is greater than the threshold voltage of electrophoretic particles 35 (greater threshold voltage) to rear electrode 46, electrophoretic particles 34 (positively charged) move to the side of rear electrode 46 while electrophoretic particles 35 (negatively charged) move to the side of front electrode 40, as shown in FIG. 4B. At this time, the color visually observed from the side of front electrode 40 is the color of electrophoretic particles 35 (if the color suspended particles are dispersed in the dispersing medium).

To the above display medium, when a voltage (+) that is greater than the threshold voltage of electrophoretic particles 34 (smaller threshold voltage) but less than the threshold voltage of electrophoretic particles 35 (greater threshold voltage) is applied to rear electrode 46, and a voltage (−) that is greater than the threshold voltage of electrophoretic particles 34 (smaller threshold voltage) but less than the threshold voltage of electrophoretic particles 35 (greater threshold voltage) is applied to front electrode 40, electrophoretic particles 35 (negatively charged) remain at the side of front electrode 40 while the electrophoretic particles 34 (positively charged) move to the side of front electrode 40, as shown in FIG. 4A. At this time, the color visually observed from the side of front electrode 40 is a mixed color of electrophoretic particles 34 and 35.

Figure 4C:
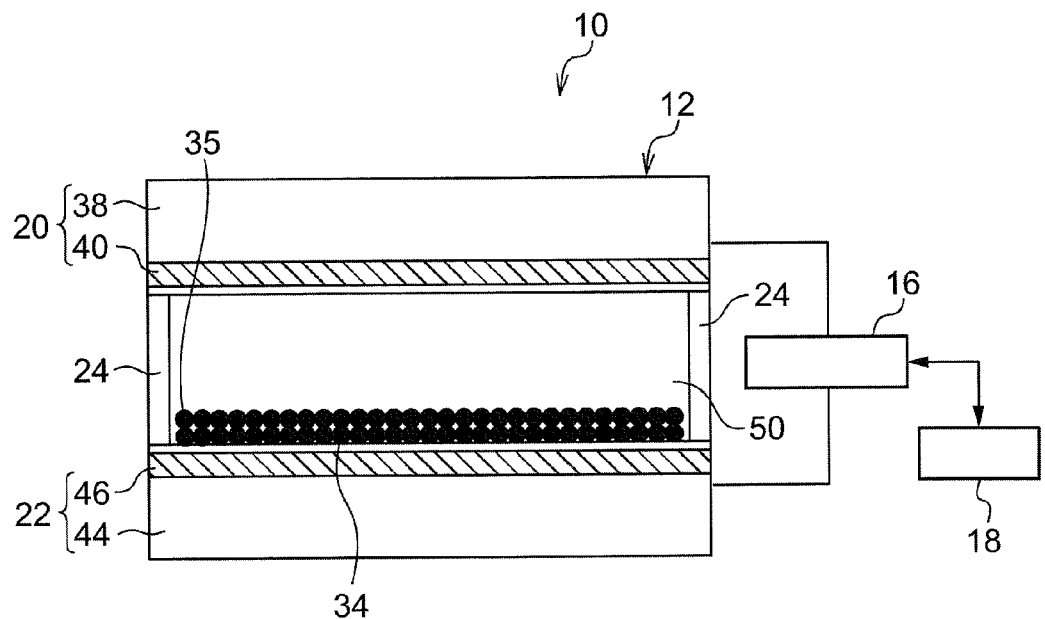
Figure 4D:
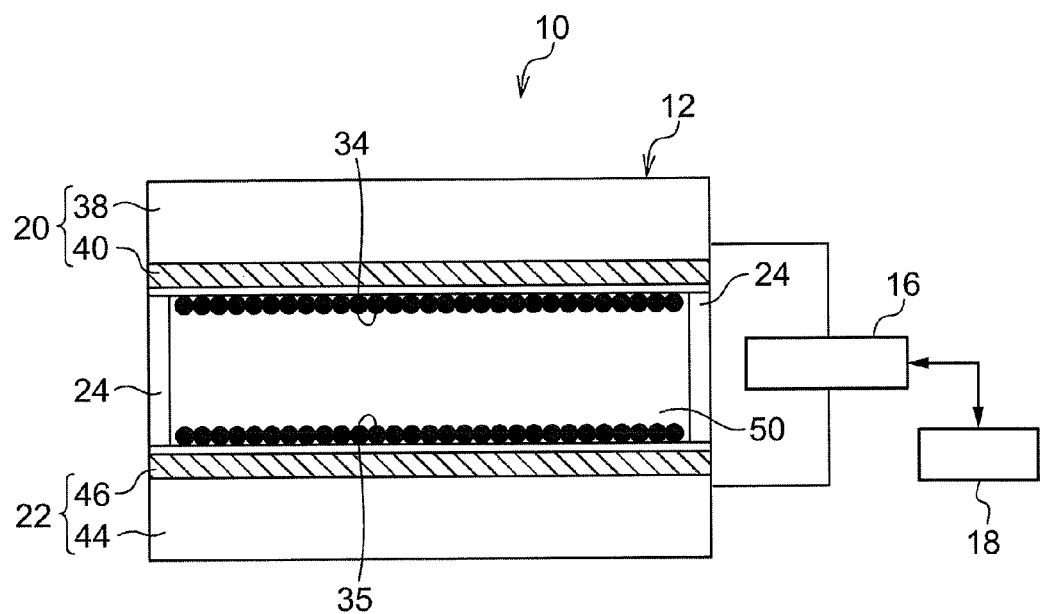

Subsequently, when a voltage (+) that is greater than the threshold voltage of electrophoretic particles 35 (greater threshold voltage) is applied to rear electrode 46, and a voltage (−) that is greater than the threshold voltage of electrophoretic particles 35 (greater threshold voltage) to front electrode 40, electrophoretic particles 34 (positively charged) remain at the side of front electrode 40 while electrophoretic particles 35 (negatively charged) move to the side of rear electrode 46, as shown in FIG. 4D. At this time, the color visually observed from the side of front electrode 40 is the color of electrophoretic particles 34 (if the color suspended particles are dispersed in the dispersing medium).

Further, when a voltage (−) that is greater than the threshold voltage of electrophoretic particles 34 (smaller threshold voltage) but less than the threshold voltage of electrophoretic particles 35 (greater threshold voltage) is applied to rear electrode 46, and a voltage (+) that is greater than the threshold voltage of electrophoretic particles 34 (smaller threshold voltage) but less than the threshold voltage of electrophoretic particles 35 (greater threshold voltage) is applied to front electrode 40, electrophoretic particles 35 (negatively charged) remain at the side of rear electrode 46 while the electrophoretic particles 34 (positively charged) move to the side of rear electrode 46, as shown in FIG. 4C. At this time, neither the color of electrophoretic particles 34 nor the color of electrophoretic particles 35 is visually observed from the side of front electrode 40 (if the color suspended particles are dispersed in the dispersing medium).

In the following, details of the components of the electrophoretic particles and the electrophoretic particle dispersion according to this exemplary embodiment are described.

(Mother Particles)

The electrophoretic particles according to this exemplary embodiment, as described above, are formed from mother particles having the surface covered with a dispersant.

Resin

The mother particles may be formed from a resin and a colorant included in the resin. The resin may be a thermoplastic resin, a thermosetting resin, or the like.

Exemplary thermoplastic resins for producing the mother particles include homopolymers or copolymers of a resin including styrenes such as styrene and chlorostyrene; monoolefins such as ethylene, propylene, butylene and isoprene; vinyl esters such as vinyl acetate, vinyl propionate, vinyl benzoate and vinyl butyrate; alpha-methylene aliphatic monocarboxylates such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone.

Exemplary thermosetting resins for producing the mother particles include crosslinked resins such as a crosslinked copolymer including divinyl benzene as a main component or a crosslinked polymethyl methacrylate, phenol resins, urea resins, melamine resins, polyester resins, and silicone resins. Among these, typical examples of the resin include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

Among the above exemplary resins, the resin is particularly preferably at least one selected from poly-2-acrylamide-2-methylpropane sulfonic acid, a copolymer of 2-acrylamide-2-methyl propane sulfonic acid and acrylamide, acrylic resins and a copolymer thereof, styrene-maleic acid copolymer, dimethylamine-epichlorohydrin condensate, and cationized polyvinyl alcohol.

Colorant

Exemplary colorants used for coloring the mother particles include organic or inorganic pigments and oil-soluble dyes. Specific examples thereof include known materials such as magnetic powders of magnetite, ferrite and the like, carbon black, titanium oxide, magnesium oxide, zinc oxide, phthalocyanine copper-based cyan colorant, azo-based yellow colorant, azo-based magenta colorant, quinacridone-based magenta colorant, red colorant, green colorant, and blue colorant. Specific examples of the colorant include aniline blue, Calco Oil blue, chrome yellow, ultramarine blue, DuPont Oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, and C. I. Pigment Blue 15:3.

Other Additives

A charge controlling agent may be mixed in the resin used for the mother particles. Examples of the charge controlling agent include known materials used for electrophotographic toners, for example, quaternary ammonium salts such as cetylpyridyl chloride, BONTRON P-51, BONTRON P-53, BONTRON E-84 and BONTRON E-81 (trade name, manufactured by Orient Chemical Industries, Co., Ltd.), salicylic acid-based metal complexes, phenol-based condensates, tetraphenyl-based compounds, metal oxide particles, and metal oxide particles having the surface treated with a coupling agent of various kinds.

A magnetic material may be mixed in the mother particles. Examples of the magnetic material include an inorganic or organic magnetic material that may have a color coating. Transparent magnetic materials, particularly transparent organic materials, are particularly preferred.

The average particle diameter of the mother particles is preferably from 0.1 µm to 10 µm, but the invention is not limited thereto.

The average particle diameter of the mother particles described in the present specification is measured by using a dynamic light-scattering particle size distribution measurement device (FPAR 1000, trade name, manufactured by Otsuka Electronics, Co., Ltd.) at measurement conditions of 0.5% by weight and 25° C.

(Dispersant)

The electrophoretic particles according to this exemplary embodiment of the invention are formed from mother particles having the surface covered with a dispersant. The dispersant is preferably colorless and transparent so that the color of the mother particles is not affected.

The dispersant used in this exemplary embodiment of the invention has a structure represented by the following Formula (1).

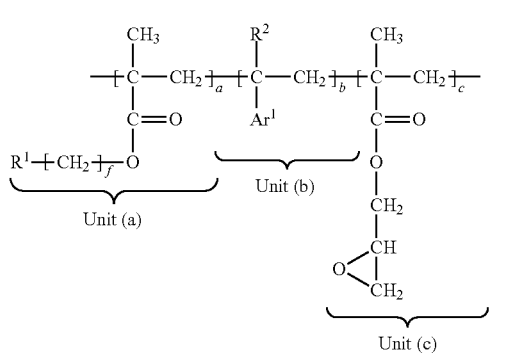

In Formula (1), $R^1$ represents a dimethyl siloxane chain that includes two or more dimethyl siloxane structures linked with each other, the dimethyl siloxane chain being optionally substituted by an organic group; $R^2$ represents a hydrogen atom or a methyl group; $Ar^1$ represents an organic group having an aromatic group; a represents an integer of from 8 to 88; b represents an integer of from 12 to 82; c represents an integer of from 0 to 30; f represents an integer of from 1 to 3; the total of a, b and c is 100; and the ratio of unit (b) in the dispersant having a structure represented by Formula (1) is 50% by weight or less, or about 50% by weight or less.

In Formula (1), a is preferably an integer of from 48 to 88, b is preferably an integer of from 12 to 52, and c is preferably an integer of from 0 to 10, respectively.

The ratio of unit (b) in the dispersant having a structure represented by Formula (1) is preferably from 0.5% by weight to 42% by weight, or from about 0.5% by weight to about 42% by weight.

Further, the dispersant having a structure represented by Formula (1) preferably has a structure represented by the following Formula (2) or the following Formula (3).

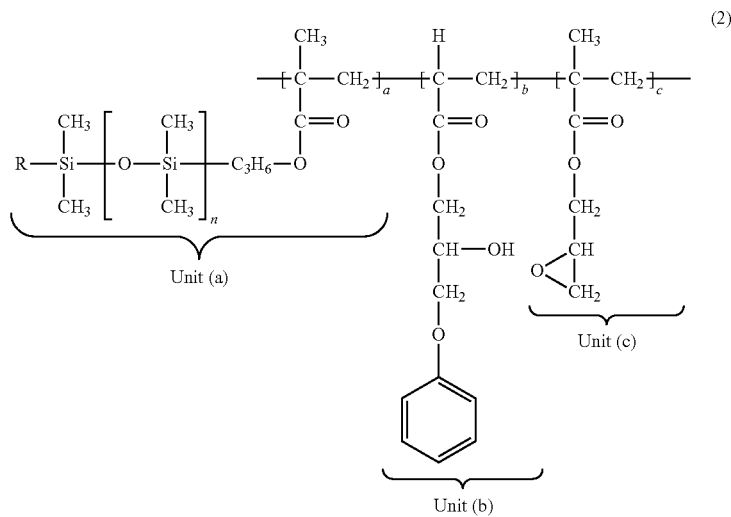

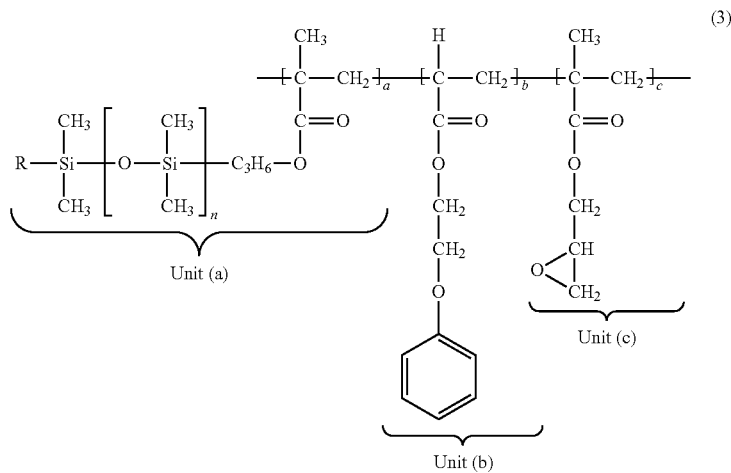

In Formula (2) and Formula (3), R represents a hydrogen atom or an organic group; a represents an integer of from 18 to 88; b represents an integer of from 12 to 82; c represents an integer of from 0 to 30; n represents an integer of from 3 to 70; and the total of a, b and c is 100. The ratio of unit (b) in the dispersant having a structure represented by Formula (2) or Formula (3) is 50% by weight or less, or about 50% by weight or less.

Examples of the organic group represented by R include an alkyl group having 1 to 10 carbon atoms that may have a substituent.

In Formula (2) or Formula (3), a is preferably an integer of from 48 to 88; b is preferably an integer of from 12 to 52; c is preferably an integer of from 0 to 10; and n is preferably an integer of from 10 to 35, respectively.

The ratio of unit (b) in the dispersant having a structure represented by Formula (2) or Formula (3) is preferably from 0.5% by weight to 20% by weight, or from about 0.5% by weight to about 20% by weight.

The structure represented by Formula (2) may be a structure represented by the following Formula (2') in which unit (d) is further included.

In Formula (2'), b+d is further preferably an integer of from 12 to 52.

Weight Average Molecular Weight

The weight average molecular weight of the dispersant having a structure represented by Formula (1), Formula (2) or Formula (3) is preferably from 2,000 to 1,000,000. The weight average molecular weight of the dispersant described in the present specification is measured by a static light-scattering method or size exclusion column chromatography.

Specific Examples

The following are specific examples of the structure represented by Formula (1), Formula (2) or Formula (3) (Compounds 1 to 3). In Compounds 1 to 3, R has the same definitions as that of Formula (2) or Formula (3), and is preferably an alkyl group having 1 to 10 carbon atoms that may have a substituent.

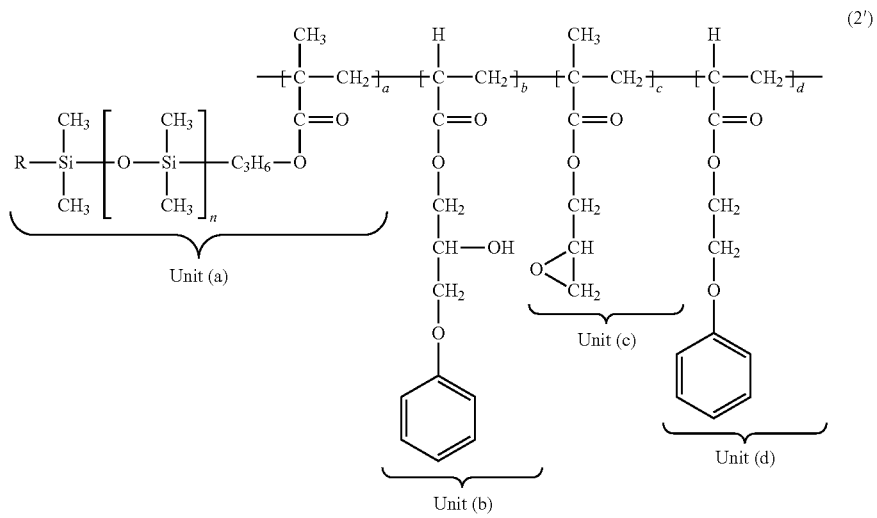

(2')

In Formula (2'), b+d is an integer of from 12 to 82, and R, a, b, c and n have the same definitions as that of Formula (2), respectively.

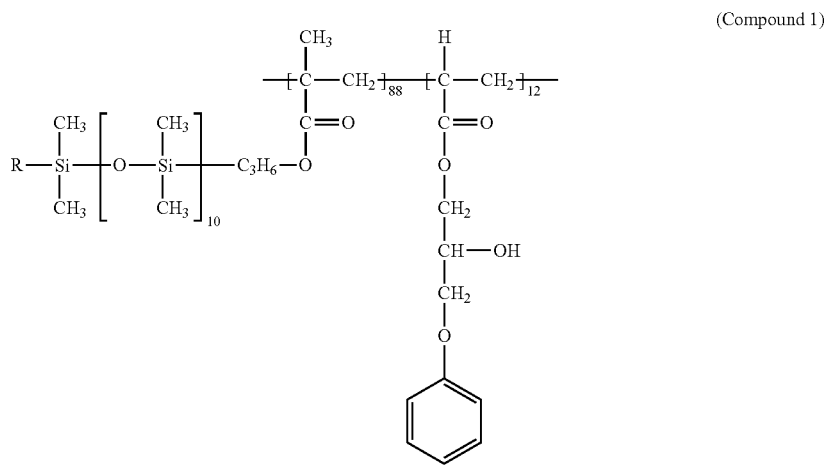

(Compound 1)

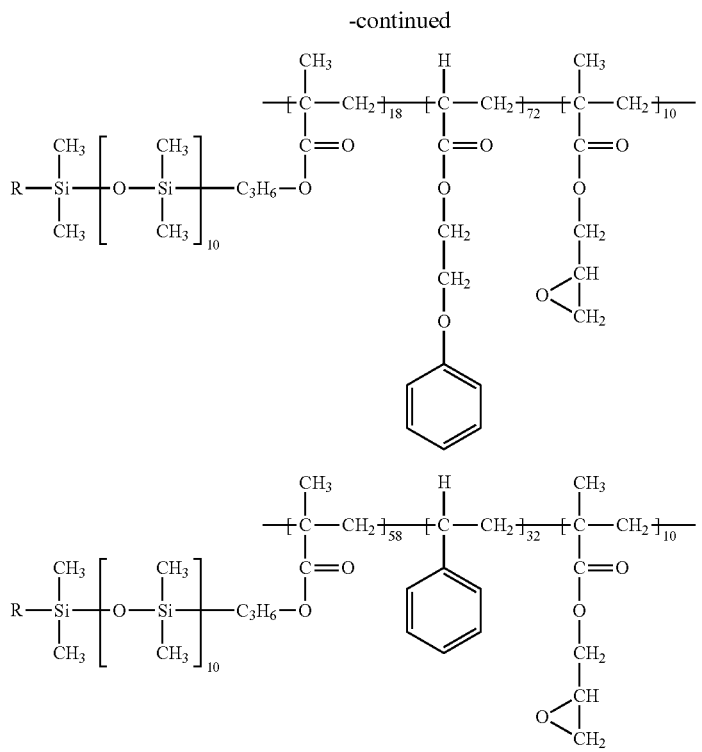

(Compound 2)

(Compound 3)

The following are preferred combinations of the specific example of the dispersant and the specific example of the resin.

Compound 1 and poly-2-acryliamide-2-methylpropane sulfonic acid

Compound 1 and cationized polyvinyl alcohol

Compound 2 and poly-2-acryliamide-2-methylpropane sulfonic acid

Synthesis Method of Dispersant

The method of synthesizing the dispersant having a structure represented by Formula (1) is not particularly limited, and may be selected from known methods. The following is an exemplary method of synthesizing the dispersant having a structure represented by Formula (1).

A solvent (such as isopropyl alcohol (IPA)) is placed in a reaction container equipped with a stirrer and a thermometer, and a monomer as a raw material for the dispersant and a polymerization initiator are dissolved therein. This solution is subjected to nitrogen bubbling (for example, 100 ml/minute for 15 minutes), and tightly sealed and stirred (for example, at 55° C. for 5 hours), thereby completing the reaction. A copolymer (dispersant having a structure represented by Formula (1) is obtained from this resin solution by evaporating the solvent.

Examples of the monomer used as the raw material for the dispersant include a monomer that can form unit (a), (b) or (c) in Formula (1) after polymerizing the same.

Examples of the polymerization initiator include V-65 and AIBN.

Examples of the solvent include isopropyl alcohol (IPA), tetrahydrofuran (THF) and dimethyl silicone oil.

Further, the ratio of unit (b) in the dispersant having a structure represented by Formula (1) can be adjusted by adjusting the ratio of the monomers used for the polymerization.

(Method of Producing Electrophoretic Particles)

There is no particular limitation to the method of producing the electrophoretic particles formed from mother particles having the surface covered with a dispersant as mentioned above, and known methods are applicable. The following is an exemplary method of producing the electrophoretic particles (solvent evaporation method).

—Solvent Evaporation Method—

First, the dispersant as prepared above is dissolved in a solvent having an insulating property (such as dimethyl silicone oil) to form a continuous phase. Then, a resin that forms the mother particles and a colorant are mixed in a good solvent (such as water) to form a dispersed phase. The continuous phase and the dispersed phase are mixed and emulsified using an emulsifier such as an ultrasonic homogenizer. Subsequently, the obtained emulsion is stirred and heated while reducing pressure (for example, 65° C./10 mPa) in order to remove the good solvent, thereby obtaining an electrophoretic particle dispersion in which electrophoretic particles are dispersed.

The resin that forms the dispersant or the mother particles, and the colorant may be suitably selected from the examples as mentioned above. The solvent having an insulating property that forms the continuous phase may be selected from the exemplary dispersing media as mentioned below.

Examples of the good solvent that forms the dispersed phase include water, lower alcohols having carbon atoms of five or less, tetrahydrofuran (THF), and acetone. Among these, water is particularly preferred in view of the charging characteristics of the electrophoretic particles.

(Dispersing Medium)

In the following, the dispersing medium used for the electrophoretic particle dispersion according to this exemplary embodiment is described. The dispersing medium in which the electrophoretic particles are dispersed is preferably an insulating liquid. In the present specification, being "insulating" refers to having a volume specific resistance of $10^{11}$ Ωcm or more.

Specific examples of the insulating liquid include hexane, cyclohexane, toluene, xylene, decane, hexadecane, kerosene, paraffin, isoparaffin, silicone oil, dichloroethylene, trichloroethylene, perchloroethylene, high-purity petroleum oil, ethylene glycol, alcohols, ethers, esters, dimethylformamide, dimethylacetoamide, dimethylsulfoxide, N-methylpyrrolidone, 2-pyrrolidone, N-methylformamide, acetonitrile, tetrahydrofuran, propylene carbonate, ethylene carbonate, benzene, diisopropyl naphthalene, olive oil, isopropanol, trichlorotrifluoroethane, tetrachloroethane, dibromotetrafluoroethane, and a mixture thereof. Among these, silicone oil is suitably used.

Water (pure water) may also be suitably used as the dispersing medium, by removing impurities therefrom so as to have a volume resistivity of preferably $10^3$ Ωcm or more, more preferably from $10^7$ Ωcm to $10^{19}$ Ωcm, yet more preferably from $10^{10}$ Ωcm to $10^{19}$ Ωcm.

Additives such as acid, alkali, salt, dispersion stabilizers, stabilizers for inhibiting oxidization or absorbing UV rays, antibacterial agents, antiseptic agents, and the like may be added to the insulating liquid, preferably such that the volume resistivity of the insulating liquid is within a range as mentioned above.

Further, the insulating liquid may include, as a charge controlling agent, an anionic surfactant, a cationic surfactant, an amphoteric surfactant, a nonionic surfactant, a fluorine-based surfactant, a silicone-based surfactant, metal soap, alkyl phosphates, succinimides, or the like.

Specific examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylol amide.

Specific examples of the anionic surfactant include alkylbenzene sulfonate, alkylphenyl sulfonate, alkyl naphthalene sulfonate, higher fatty acid salt, higher fatty acid ester, sulfates of higher fatty acid ester, and sulfonates of higher fatty acid ester.

Specific examples of the cationic surfactant include primary to tertiary amine salts and quaternary ammonium salts.

When the charge control agent is used, the amount thereof is preferably from 0.01% by weight to 20% by weight with respect to the total solid content of the particles.

A high-molecular resin may be used as the dispersing medium in combination with the insulating liquid. Suitable examples of the high-molecular resin include a high-molecular gel and a high-molecular polymer.

Examples of the high-molecular resin include natural high-molecular gels such as agarose, agaropectin, amylose, sodium alginate, propylene glycol alginate, isolichenan, insulin, ethyl cellulose, ethylhydroxy ethyl cellulose, curdlan, casein, carrageenan, carboxymethyl cellulose, carboxymethyl starch, callose, agar, chitin, chitosan, silk fibroin, guar gum, quince seed, crown-gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pusturan, funoran, decomposed xyloglucan, pectin, porphyran, methyl cellulose, methyl starch, laminaran, lichenan, lentinan, and locust bean gum; and most kinds of synthetic high-molecular gels.

Further examples include polymers having a functional group of alcohol, ketone, ether, ester or amide in the repeating unit thereof, such as polyvinyl alcohol, poly(meth)acrylamide or a derivative thereof, polyvinyl pyrrolidone, polyethylene oxide, and a copolymer including the polymer as mentioned above.

Among these, gelatin, polyvinyl alcohol and poly(meth)acrylamide are suitably used.

A colorant may be mixed in the dispersing medium so that the display medium displays a different color than that of the electrophoretic particles.

Examples of the colorant include carbon black, titanium oxide, magnesium oxide, zinc oxide, phthalocyanine copper-based cyan colorant, azo-based yellow colorant, azo-based magenta colorant, quinacridone-based magenta colorant, red colorant, green colorant, and blue colorant. Specific examples of the colorant include aniline blue, Calco Oil blue, chrome yellow, ultramarine blue, DuPont Oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, and C. I. Pigment Blue 15:3.

Color suspended particles may be dispersed in the dispersing medium. The color suspended particles are color particles that are not charged and have a different optical reflection property than that of the electrophoretic particles, which function as a reflective member that displays a different color than that of the electrophoretic particles. The color suspended particles also function as a spacer that allows the electrophoretic particles to move between the display substrate and the rear substrate without inhibiting the movement of the electrophoretic particles.

Color suspended particles may be produced by, for example, dispersing a white pigment such as titanium oxide, silicon oxide or zinc oxide in a resin such as polystyrene, polyethylene, polypropylene, polycarbonate, PMMA, acrylic resin, phenol resin, and formaldehyde condensate resin. Color suspended particles may have a color other than white, and resin particles including the aforementioned pigment or dye having an intended color may be used. When a color of RGB or YMC is desired, pigments or dyes that are typically used in printing inks or color toners may be used.

The color suspended particles may be enclosed in a space between the substrates by, for example, an inkjet method. If desired, the color suspended particles may be fixed while maintaining spaces among the particles, by melting the surface of color suspended particles by applying heat (and pressure, if necessary) after enclosing the color suspended particles.

Since the electrophoretic particles move in the dispersing medium, the viscosity thereof may be adjusted, for example, to a range of from 0.1 mPa·s to 100 mPa·s at 20° C. The viscosity of the dispersing medium can be adjusted by changing the molecular weight, structure, or composition of the dispersing medium. The measurement of the viscosity can be conducted using a viscometer, for example, B-8L, trade name, manufactured by Tokyo Keiki Inc.)

<Display Medium/Display Device>

The display medium according to this exemplary embodiment includes a pair of substrate, at least one of the substrates being transparent, and the electrophoretic particle dispersion positioned between the pair of substrates.

The display device according to this exemplary embodiment includes a pair of substrates, at least one of the substrates being transparent, the electrophoretic particle dispersion positioned between the pair of substrates, and a voltage application unit that applies a voltage to the pair of substrates.

In the following, components of the display medium and the display device according to this exemplary embodiment other than the electrophoretic particle dispersion are described.

Substrate

At least one of the pair of substrate is transparent and positioned at the display side, so that an image can be visually observed from the display side. In this exemplary embodiment, being transparent refers to having a transmittance with respect to visible light of 60% or more.

Materials for the substrate include glass, plastics such as polyethylene terephthalate resin, polycarbonate resin, acrylic resin, polyimide resin, polyester resin, epoxy resin, and polyether sulfone resin.

An electrode is provided to each of the substrates. Materials for the electrode include oxides of indium, tin, cadomium, antimony or the like, composite oxides such as ITO, metals such as gold, silver, copper, nickel or the like, and organic materials such as polypyrrole or polythiophene. These materials may be used to form a single layer, mixed layer or a composite film, and the method of forming the electrode from these materials include an evaporation method, a sputtering method, an application method, or the like. When the electrode is formed by evaporation or sputtering, the thickness thereof is typically from 100 to 2000 angstroms. Alternatively, the electrode may be formed by performing a known process such as etching used in conventional liquid crystal display media or print substrates method, in the form of matrices or stripes that enable passive matrix driving. The electrode may be embedded in the substrate.

It is also possible to provide the electrode(s) outside the display medium, separately from the substrate(s).

The electrode may be provided to both of the substrates, or to either one of the substrates so as to drive the display medium in an active matrix system.

In order to drive the display medium in an active matrix system, each pixel of the substrate may be provided with a TFT (thin film transistors).

Spacers

Spacers that maintain a space between the pair of substrates (for example, spacers 24 shown in FIGS. 4A to 4D) may be formed from thermoplastic resin, thermosetting resin, electron-curable resin, photo-curable resin, rubber, metal or the like, so that the transparency of the substrate is not impaired.

The spacers may be formed in an integrated manner with one of the pair of substrates by subjecting the substrate to an etching treatment, a laser treatment, or a pressing or printing treatment using a previously prepared mold. In this case, the spacers may be formed on one or both of the substrates.

The spacers may have a color or colorless, but are preferably colorless and transparent so that the display of an image on the display medium is not impaired. In this case, the spacers may be formed from a transparent resin such as polystyrene resin, polyester resin or acrylic resin. As mentioned above, being transparent refers to having a transmittance with respect to visible light of 60% or more.

Display Medium

The size of the cell used in the display medium has a close relationship with the fineness of the image displayed on the display medium. The smaller the cell is, the higher the fineness of the image displayed on the display medium is. The size of the cell in a planar direction of the substrate is typically from 10 µm to 1 mm.

The substrates are fixed to each other via the spacer by using a fixing means such as a combination of bolts and nuts, clamps, clips, or a frame for fixing the substrates. Alternatively, the substrates may be fixed to each other using an adhesive, or subjecting the substrates to a hot-melting treatment or a supersonic treatment.

The display medium as prepared above are capable of storing or rewriting an image, and are applicable to, for example, information boards, circulation boards, electronic blackboards, circulars, billboards, blinking signals, electronic paper, electronic newspaper, electronic books, and document sheets that can be used both in copiers and printers.

As mentioned above, the display device according to this exemplary embodiment includes the display medium and a voltage application unit that applies a voltage to the display medium.

Voltage Application Unit and Control Unit

The voltage application unit (an example of the voltage application unit) is electrically connected to the substrates. In this exemplary embodiment, the voltage application unit is electrically connected to both of the substrates: however, the voltage application unit may be electrically connected to one of the substrates while the other is grounded.

The voltage application unit is connected to a control unit so that the voltage application unit can receive signals from the control unit.

The control unit in this exemplary embodiment may be a microcomputer that includes a CPU (computer processing unit) that controls the operation of the whole device, a RAM (random access memory) that temporarily stores data, and a ROM (read only memory) that stores data for controlling the whole device.

The voltage application unit is a unit that applies a voltage to the electrodes in accordance with the signals sent from the control unit.

EXAMPLES

In the following, the invention is explained in further detail with reference to the examples. However, the invention is not limited to these examples.

Example 1

Synthesis of Dispersing Medium 1

7 parts by weight of isopropyl alcohol (IPA) as a solvent is placed in a reaction container equipped with a stirrer and a thermometer. A solution of monomer (a) (SILAPLANE FM-0711, trade name, manufactured by Chisso Corporation), monomer (b) (2-hydroxy-3-phenoxypropyl acrylate, NK ESTER 702A, trade name, manufactured by Shin-Nakamura Chemical Co., Ltd.) and a polymerization initiator is added thereto and dissolved in the IPA. This solution is subjected to nitrogen bubbling (100 ml/minute, 15 minutes) and the container is tightly sealed. The solution is stirred while maintaining the temperature at 55° C. for 5 hours, thereby completing the reaction. The IPA is evaporated from this resin solution, and a copolymer (dispersant 1, corresponding to Compound 1 as mentioned above) is obtained.

Synthesis of Cyan Electrophoretic Particles C1

3 parts by weight of dispersant 1 as prepared above are dissolved in 97 parts by weight of dimethyl silicone oil (insulating solvent, KF-96-2CS, trade name, manufactured by Shin-Etsu Chemical Co., Ltd.) to prepare a continuous phase. Then, as the raw materials for mother particles, 10 parts by weight of an ionic polymer compound (poly-2-acrylamide-2-methylpropane sulfonic acid, 3 parts by weight of a colorant (cyan pigment, C. I. Pigment Blue 15:3, H254F, EMA-COL, trade name, manufactured by Sanyo Color Works, Ltd.), and 85 parts by weight of water as a good solvent are mixed to prepare a dispersed phase.

The continuous phase and the dispersed phase are mixed and emulsified using a supersonic homogenizer (UH-600S, trade name, manufactured by SMT Co., Ltd.) for 10 minutes.

Subsequently, the obtained emulsion is placed in a recovery flask and the water is removed by heating (65° C.) and reducing pressure (10 mPa) while stirring the emulsion, thereby obtaining an electrophoretic particle dispersion including cyan electrophoretic particles C1 dispersed in silicone oil.

The average particle diameter of the cyan electrophoretic particles C1 as measured by using a dynamic light-scattering particle size distribution measurement device (FPAR 1000, trade name, manufactured by Otsuka Electronics Co., Ltd.) is 500 nm.

The obtained electrophoretic particle dispersion is diluted with dispersing medium 1 so that the solid content of the dispersion is 0.1% by weight, a pair of electrode substrates facing each other with a space of 1 mm are immersed therein, and a voltage (100 V) is applied to the electrodes for 10 seconds. The polarity of electrophoretic particles C1 is measured by allowing the particles to electrically deposit to the electrodes. As a result, the electrophoretic particles C1 are positively charged.

Examples 2 to 5 and Comparative Examples 1 to 4

Dispersants for Examples 2 to 5 and Comparative Examples 1 to 4 are prepared in a similar manner to dispersant 1 of Example 1, while changing the type and the amount of monomer (a) and monomer (b) as shown in Table 1. In Comparative Example 4, monomer (c) is further used for synthesizing the dispersant.

Then, cyan electrophoretic particle dispersion for Examples 2 to 5 and Comparative Examples 1 to 4 are prepared in a similar manner to Example 1, while changing the resin for the mother particles to those as shown in Table 2.

—Method of Measuring Threshold Voltage—

The voltage at which the obtained cyan electrophoretic particles start to move upon application of an electric field (voltage applied to the electrodes) is measured. Specifically, transparent glass electrodes (1 cm×5 cm) are placed so as to face each other via spacers (thickness: 100 µm). The cyan electrophoretic particle dispersion is injected in the space between the electrodes from the side portion thereof. First, a direct voltage is applied to the electrodes to allow the electrophoretic particles to move to the side of the electrodes. At this time, the color of electrophoretic particles that have moved onto the side of the electrodes is observed from the side portion of the transparent glass electrodes. Thereafter, a triangle wave (0.5 V/sec) is applied between the electrodes and the intensity thereof is measured from the side portion of the transparent glass electrodes, and the voltage at which the color starts to change is determined as the threshold voltage (the voltage at which the particles start to move). The results are shown in Table 2.

TABLE 1

| | Dispersant | | | | | | | |
|---|---|---|---|---|---|---|---|---|
| | Monomer (a) | | Monomer (b) | | Monomer (c) | | | |
| | Compound | parts by weight | Compound | parts by weight | Compound | parts by weight | Polymerization initiator | Notes |
| Ex. 1 | SILAPLANE FM-0711 | 97 | 2-hydroxy-3-phenoxypropyl acrylate | 3 | — | — | V-65 | Compound 1 |
| Ex. 2 | SILAPLANE FM-0711 | 94 | 2-hydroxy-3-phenoxypropyl acrylate | 6 | — | — | V-65 | — |
| Ex. 3 | SILAPLANE FM-0711 | 81 | 2-hydroxy-3-phenoxypropyl acrylate | 19 | — | — | V-65 | — |
| Ex. 4 | SILAPLANE FM-0711 | 55 | 2-hydroxy-3-phenoxypropyl acrylate | 45 | — | — | V-65 | — |
| Ex. 5 | SILAPLANE FM-0711 | 97 | 2-hydroxy-3-phenoxypropyl acrylate | 3 | — | — | V-65 | Compound 1 |
| Com. Ex. 1 | SILAPLANE FM-0711 | 98 | hydroxyethyl methacrylate | 2 | — | — | V-65 | — |
| Com. Ex. 2 | SILAPLANE FM-0711 | 94 | hydroxyethyl methacrylate | 6 | — | — | V-65 | — |
| Com. Ex. 3 | SILAPLANE FM-0711 | 66 | hydroxyethyl methacrylate | 34 | — | — | V-65 | — |
| Com. Ex. 4 | SILAPLANE FM-0711 | 10 | phenoxyethyleneglycol acrylate | 83 | glycidyl methacrylate | 7 | V-65 | — |

TABLE 2

| | Dispersant Unit (b) | Ratio of unit (b) (% by weight) | Mother particles Resin | Threshold voltage (V) |
|---|---|---|---|---|
| Ex. 1 | 2-hydroxy-3-phenoxypropyl acrylate | 3 | Poly-2-acrylamide-2-methylpropane sulfonic acid | 8.5 |
| Ex. 2 | 2-hydroxy-3-phenoxypropyl acrylate | 6 | Poly-2-acrylamide-2-methylpropane sulfonic acid | 7.5 |
| Ex. 3 | 2-hydroxy-3-phenoxypropyl acrylate | 19 | Poly-2-acrylamide-2-methylpropane sulfonic acid | 6.8 |
| Ex. 4 | 2-hydroxy-3-phenoxypropyl acrylate | 45 | Poly-2-acrylamide-2-methylpropane sulfonic acid | 2.2 |

TABLE 2-continued

| | Dispersant Unit (b) | Ratio of unit (b) (% by weight) | Mother particles Resin | Threshold voltage (V) |
|---|---|---|---|---|
| Ex. 5 | 2-hydroxy-3-phenoxypropyl acrylate | 3 | Cationized polyvinyl alcohol | 6.2 |
| Com. Ex. 1 | hydroxyethyl methacrylate | 2 | Poly-2-acrylamide-2-methylpropane sulfonic acid | 5.3 |
| Com. Ex. 2 | hydroxyethyl methacrylate | 6 | Poly-2-acrylamide-2-methylpropane sulfonic acid | 5.2 |
| Com. Ex. 3 | hydroxyethyl methacrylate | 34 | Poly-2-acrylamide-2-methylpropane sulfonic acid | 5.4 |
| Com. Ex. 4 | phenoxyethyleneglycol acrylate | 83 | Poly-2-acrylamide-2-methylpropane sulfonic acid | 1.3 |

All publications, patent applications, and technical standards mentioned in this specification are herein incorporated by reference to the same extent as if each individual publication, patent application, or technical standard was specifically and individually indicated to be incorporated by reference.

What is claimed is:

1. Electrophoretic particles comprising mother particles and a dispersant that covers the surface of the mother particles, the mother particles comprising a resin and a colorant, wherein the dispersant has a structure represented by the following Formula (2) or the following Formula (3):

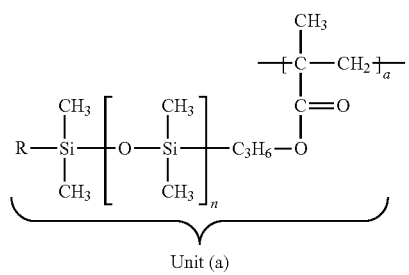

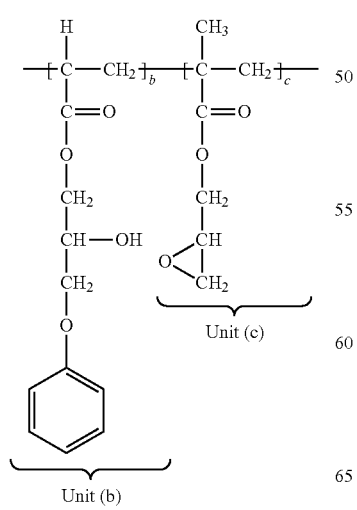

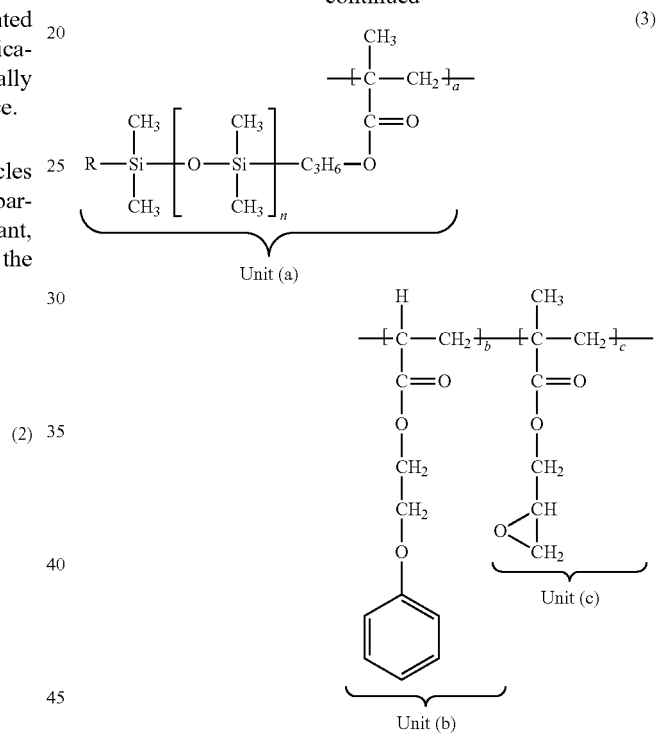

wherein in Formula (2) and Formula (3), R represents a hydrogen atom or an organic group; a represents an integer of from 18 to 88; b represents an integer of from 12 to 82; c represents an integer of from 0 to 30; n represents an integer of from 3 to 70; the total of a, b and c is 100; and the ratio of unit (b) in the dispersant having a structure represented by Formula (2) or Formula (3) is about 50% by weight or less.

2. The electrophoretic particles according to claim 1, wherein a is an integer of from 48 to 88, b is an integer of from 12 to 52, and c is an integer of from 0 to 10.

3. The electrophoretic particles according to claim 1, wherein the ratio of unit (b) in the dispersant having a structure represented by Formula (2) or Formula (3) is from about 0.5% by weight to about 20% by weight.

4. An electrophoretic particle dispersion comprising electrophoretic particles and a dispersing medium in which the electrophoretic particles are dispersed, wherein the dispersant has a structure represented by the following Formula (2) or the following Formula (3):

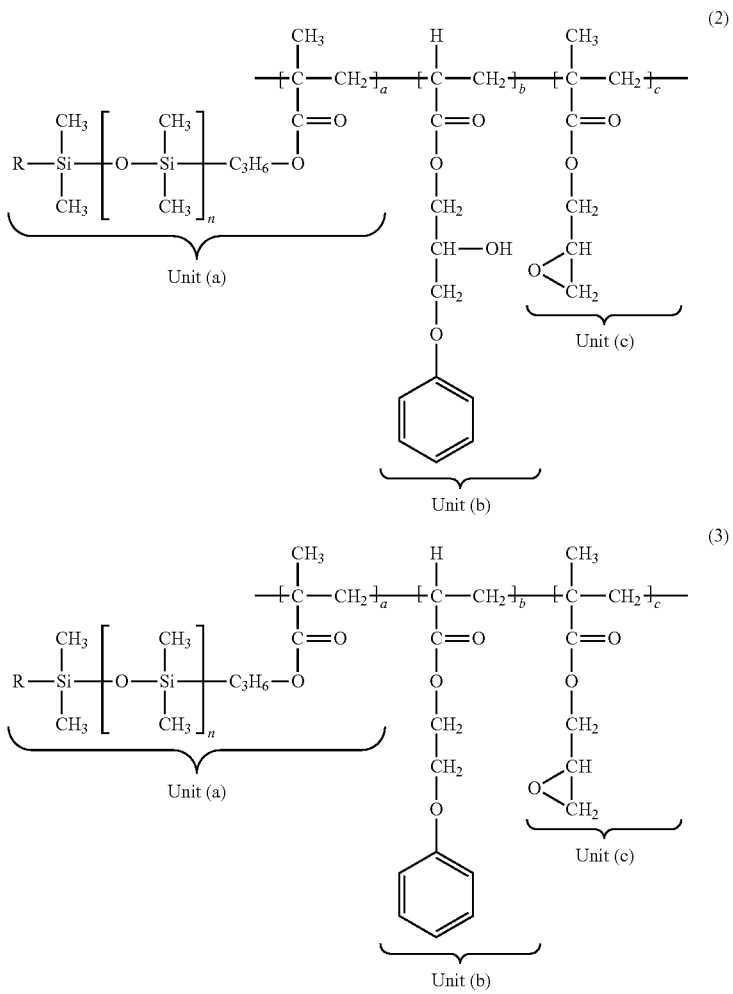

wherein in Formula (2) and Formula (3), R represents a hydrogen atom or an organic group; a represents an integer of from 18 to 88; b represents an integer of from 12 to 82; c represents an integer of from 0 to 30; n represents an integer of from 3 to 70; the total of a, b and c is 100; and the ratio of unit (b) in the dispersant having a structure represented by Formula (2) or Formula (3) is about 50% by weight or less.

5. The electrophoretic particle dispersion according to claim 4, wherein a is an integer of from 48 to 88, b is an integer of from 12 to 52, and c is an integer of from 0 to 10.

6. The electrophoretic particle dispersion according to claim 4, wherein the ratio of unit (b) in the dispersant having a structure represented by Formula (1) is from about 0.5% by weight to about 20% by weight.

7. A display medium comprising:
a pair of substrates, at least one of the pair of substrates being transparent; and
the electrophoretic particle dispersion according to claim 4.

8. A display device comprising:
a pair of substrates, at least one of the pair of substrates being transparent;
the electrophoretic particle dispersion according to claim 4; and
a voltage application unit that applies a voltage to the pair of substrates.

* * * * *